United States Patent
Kitajima et al.

(10) Patent No.: US 9,517,709 B2
(45) Date of Patent: Dec. 13, 2016

(54) VEHICLE SEAT

(71) Applicant: NHK SPRING CO., LTD., Yokohama-shi (JP)

(72) Inventors: Toshiyuki Kitajima, Yokohama (JP); Tuyoshi Mutoh, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 0 days.

(21) Appl. No.: 14/432,174

(22) PCT Filed: Sep. 6, 2013

(86) PCT No.: PCT/JP2013/074156
§ 371 (c)(1),
(2) Date: Mar. 27, 2015

(87) PCT Pub. No.: WO2014/054382
PCT Pub. Date: Apr. 10, 2014

(65) Prior Publication Data
US 2015/0291070 A1    Oct. 15, 2015

(30) Foreign Application Priority Data

Oct. 4, 2012    (JP) .................................. 2012-222451

(51) Int. Cl.
| | | |
|---|---|---|
| *B60N 2/70* | (2006.01) | |
| *B60N 2/58* | (2006.01) | |
| *B60N 2/64* | (2006.01) | |

(52) U.S. Cl.
CPC ............... *B60N 2/5883* (2013.01); *B60N 2/58* (2013.01); *B60N 2/646* (2013.01); *B60N 2/70* (2013.01); *B60N 2/7017* (2013.01)

(58) Field of Classification Search
CPC ..... B60N 2/5883; B60N 2/646; B60N 2/7017; B60N 2/58; B60N 2/70

(Continued)

(56) References Cited

U.S. PATENT DOCUMENTS

| | | | | |
|---|---|---|---|---|
| 7,287,812 | B2 * | 10/2007 | Ishima ................. | B60N 2/5657 297/180.14 |
| 2013/0099550 | A1 * | 4/2013 | Ota ...................... | B60N 2/7017 297/452.42 |

FOREIGN PATENT DOCUMENTS

| | | | |
|---|---|---|---|
| DE | EP 0302281 A2 * | 2/1989 | |
| DE | 10261902 A1 * | 8/2004 | |

(Continued)

OTHER PUBLICATIONS

Office Action dated May 12, 2015 in corresponding Japanese Application No. 2012-222451.

(Continued)

*Primary Examiner* — Anthony D Barfield
(74) *Attorney, Agent, or Firm* — Knobbe Martens Olson & Bear LLP

(57) ABSTRACT

A vehicle seat is obtained capable of suppressing the occurrence of wrinkles in natural leather employed in a cover while suppressing a reduction in seating comfort of the seat. A non-woven fabric is disposed between a foam member and a foam member, so as to cover a portion of contact with the buttocks of a seated occupant, as viewed from above. The non-woven fabric suppresses extension and contraction of natural leather at the pressed portion, thereby suppressing the occurrence of wrinkles in the natural leather at the pressed portion. By only suppressing the extension-contraction amount of the natural leather at the portion where wrinkles are liable to occur, the occurrence of wrinkles in the natural leather can be suppressed while suppressing a reduction in the seating comfort of the seat.

3 Claims, 8 Drawing Sheets

(58) Field of Classification Search
USPC .................................................... 297/452.58
See application file for complete search history.

(56) References Cited

FOREIGN PATENT DOCUMENTS

| | | |
|---|---|---|
| JP | H07-285176 A | 10/1995 |
| JP | 2006-262959 | 10/2006 |
| JP | 2007-054383 | 3/2007 |
| JP | 2007-159628 | 6/2007 |
| JP | DE 102012202631 A1 * | 8/2012 |

OTHER PUBLICATIONS

Office Action for Corresponding Japanese Application No. 2012-222451 mailed Jul. 21, 2015.
Search Report issued in application No. PCT/JP2013/074156 on Nov. 5, 2013.

* cited by examiner

VEHICLE SEAT

CROSS-REFERENCE TO RELATED APPLICATIONS

This application is the U.S. National Phase under 35 U.S.C. §371 of International Application PCT/JP2013/074156, filed Sep. 6, 2013, which claims priority to Japanese Patent Application No. 2012-222451, filed Oct. 4, 2012. The disclosures of the above-described applications are hereby incorporated by reference in their entirety and are hereby expressly made a portion of this application. The International Application was published under PCT Article 21(2) in a language other than English.

TECHNICAL FIELD

The present invention relates to a vehicle seat employed in a vehicle.

BACKGROUND ART

Patent Document 1 (Japanese Patent Application Laid-Open (JP-A) No. 2006-262959) describes a configuration in which natural leather is employed as an outer surface of a cover of a vehicle seat.

In this configuration, the cover includes the natural leather, an outer layer portion A formed of an upper portion wadding (a plate shaped foam body) adhered to the entire back face of the natural leather, and an inner layer portion B formed of a lower portion wadding (a plate shaped foam body). The cover is configured such that an outer edge of the inner layer portion B is joined to the outer layer portion A.

A wadding cover configured of a non-woven fabric or the like is adhered to the entire back face of the upper portion wadding.

SUMMARY OF INVENTION

Technical Problem

However, since the non-woven fabric is adhered to the entire face of the plate shaped foam body adhered to the natural leather, deformation (stretching) of the cover is suppressed across the entire cover when an occupant sits on the seat. The seating comfort of the seat is accordingly reduced.

An object of the present invention is to suppress the occurrence of wrinkles in natural leather employed in a cover, while suppressing a reduction in the seating comfort of a seat.

Solution to Problem

A vehicle seat of a first aspect of the present invention includes: a seat cushion that supports the buttocks of a seated occupant; a seatback that supports the back and the lumbar region of the seated occupant; and a cover member that configures a portion of a cover covering the seat cushion or the seatback, and includes natural leather disposed at an outer surface of the cover member, a plate shaped first foam body adhered to the inside of the natural leather, a plate shaped second foam body adhered to the inside of the first foam body, an inside non-woven fabric adhered to the inside of the second foam body, and an intermediate non-woven fabric adhered between the first foam body and the second foam body at a location of contact of the cover member with the body of the seated occupant.

In the above configuration, the cover member that configures a portion of the cover includes the natural leather disposed at the outer surface of the cover member, the first foam body adhered to the inside of the natural leather, the second foam body adhered to the inside of the first foam body, the inside non-woven fabric adhered to the inside of the second foam body, and the intermediate non-woven fabric adhered between the first foam body and the second foam body at a location of contact of the cover member with the body of the seated occupant.

By providing the intermediate non-woven fabric at a location where the natural leather repeatedly extends and contracts by a large amount on contact with the body of the occupant due to the occupant repeatedly sitting, the extension-contraction amount of the natural leather at the location that extends and contracts by a large amount is suppressed. Occurrence of wrinkles in the natural leather used in the cover is thereby suppressed.

Due to only providing the intermediate non-woven fabric at the location that repeatedly extends and contracts by a large amount, the natural leather at other locations expands and contracts, although not as much as the location of contact with the body of the occupant. A reduction in the seating comfort of the seat is thereby suppressed.

As explained above, the occurrence of wrinkles in the natural leather employed in the cover can be suppressed while suppressing a reduction in the seating comfort of the seat.

In the above aspect, the intermediate non-woven fabric may be provided at a location of contact between the buttocks of the occupant and the cover member.

In the above configuration, the intermediate non-woven fabric is provided at a location of contact between the buttocks of the occupant and the cover member, thereby enabling the occurrence of wrinkles in the natural leather in repeated contact with the buttocks of the occupant to be suppressed.

In the above aspect, the seat cushion may include side support portions that protrude out further than other locations and suppress the seated occupant from sliding in the seat width direction, a main portion that is disposed between the side support portions and supports the buttocks of the seated occupant, and a main front portion that is disposed in front of the main portion and supports the thighs of the occupant, and the cover member may cover the main portion.

In the above configuration, the main portion of the seat cushion supports the buttocks of the occupant. Since the cover member covers the main portion, the occurrence of wrinkles in the cover member covering the main portion can be suppressed.

Advantageous Effects of Invention

The present invention enables the occurrence of wrinkles in natural leather employed in a cover to be suppressed while suppressing a reduction in the seating comfort of a seat.

DESCRIPTION OF EMBODIMENTS

Figure 1:
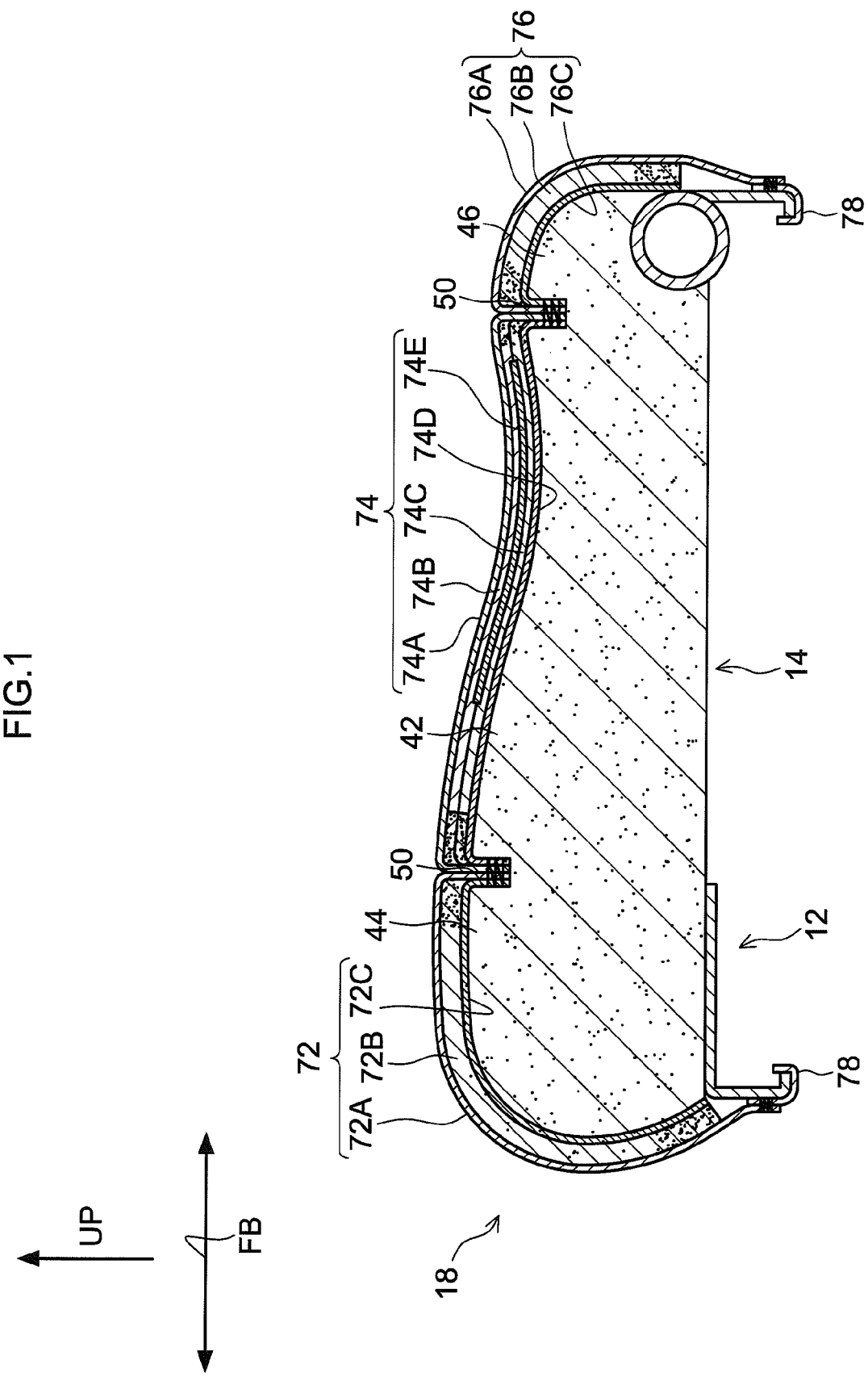
FIG. 1 is a cross-section of a seat cushion and the like employed in a seat according to a first exemplary embodiment, taken along the seat width direction.

Explanation follows regarding an example of a vehicle seat according to a first exemplary embodiment of the present invention, with reference to FIG. 1 to FIG. 7. Note that in the drawings, the arrow UP indicates upward in the vertical direction, the arrow WI indicates the seat width direction, and the arrow FB direction indicates the seat front-rear direction.

Overall Configuration

Figure 7:
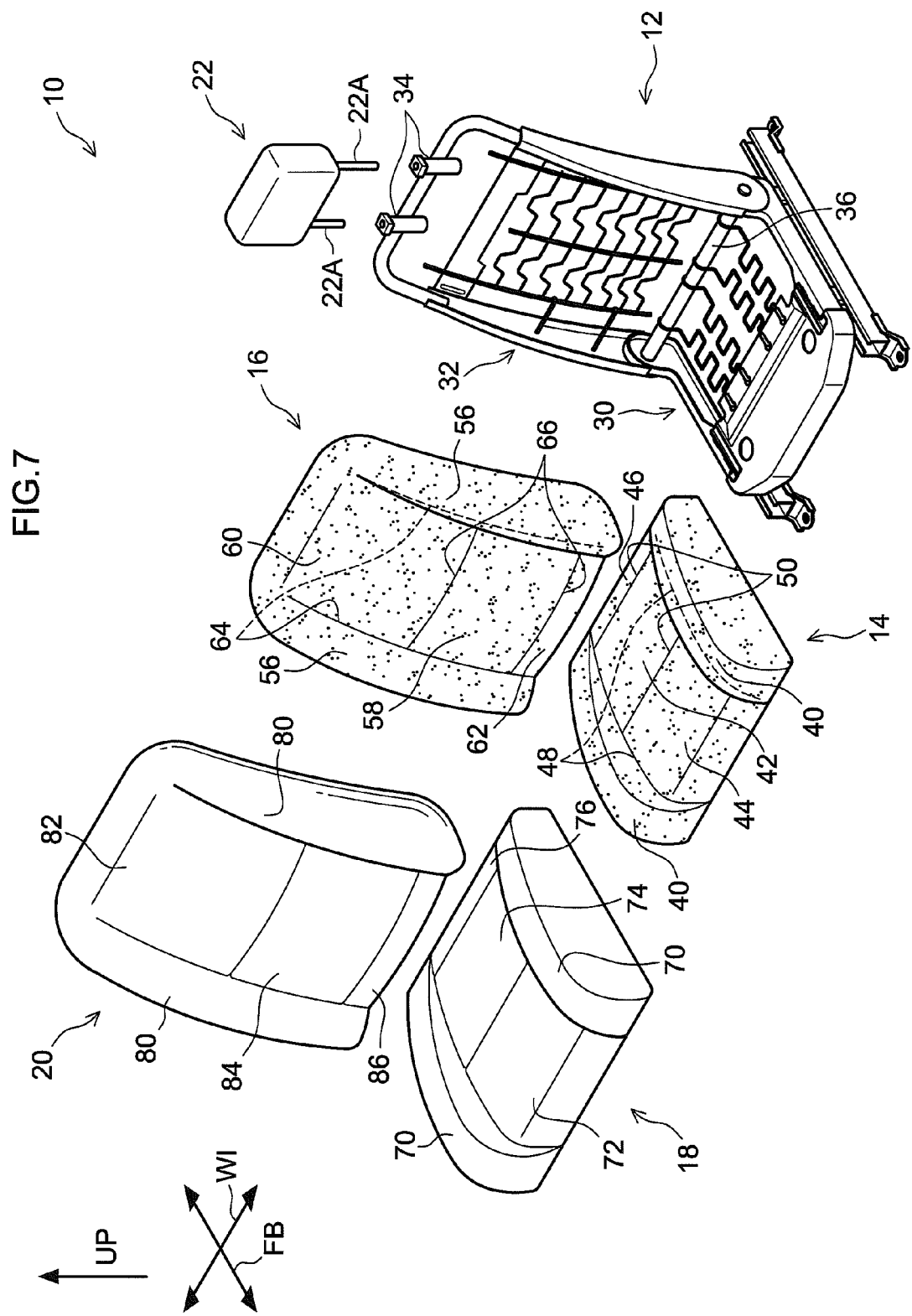
FIG. 7 is an exploded perspective view of a seat according to the first exemplary embodiment.

As illustrated in FIG. 7, a vehicle seat 10 (hereafter simply referred to as "seat 10") is a seat used in a foremost row of a vehicle. The seat 10 includes a frame 12 that is a supporting body, a seat cushion 14 that is attached to the frame 12 and supports the buttocks, etc. of a seated occupant, a seatback 16 that is attached to the frame 12 and supports the back and lumbar region, etc. of the seated occupant, and a headrest 22 that is attached to the frame 12 and supports the head of the seated occupant.

The seat 10 further includes a cushion cover 18 serving as an example of a cover covering the seat cushion 14, and a back cover 20 serving as an example of a cover covering the seatback 16.

Frame

First, explanation follows regarding the frame 12. The frame 12 includes a cushion frame 30 that supports the seat cushion 14, a back frame 32 that supports the seatback 16, and a pair of head brackets 34 that supports the headrest 22.

A rear end side of the cushion frame 30 in the seat front-rear direction, and a lower end side of the back frame 32 in the vertical direction, are coupled together by a shaft member 36 extending along the seat width direction. The back frame 32 turns about the center of rotation of the shaft member 36.

The two head brackets 34 are provided attached to an upper end side of the back frame 32, separated from each other in the seat width direction. The head brackets 34 are each formed with a tubular profile extending along the up-down direction. A pair of supporting bars 22A, provided to the headrest 22, is inserted into the head brackets 34, and the headrest 22 is thereby supported by the frame 12 (the head brackets 34).

Seat Cushion

Explanation follows regarding the seat cushion 14. The seat cushion 14 is formed by foam molding a foamable urethane resin, and includes a pair of side support portions 40 that suppresses the seated occupant from sliding in the seat width direction. The side support portions 40 are formed extending along the seat front-rear direction at both end portions of the seat cushion 14 in the seat width direction, protruding further upward than other locations of the seat cushion 14.

The seat cushion 14 further includes a main portion 42 disposed between the pair of side support portions 40, a main front portion 44 disposed in front of the main portion 42 in the seat front-rear direction, and a main rear portion 46 disposed at the rear of the main portion 42 in the seat front-rear direction. The main portion 42 supports the buttocks of the seated occupant, and the main front portion 44 supports the thighs of the seated occupant.

Groove portions 48 are formed extending along the seat front-rear direction between the main front portion 44, the main portion 42, and the main rear portion 46, and the pair of side support portions 40. Wires, not illustrated in the drawings, employed to fix the cushion cover 18, are disposed inside the groove portions 48.

Groove portions 50 are formed extending along the seat width direction between the main front portion 44 and the main portion 42, and between the main portion 42 and the main rear portion 46. Wires, not illustrated in the drawings, employed to fix the cushion cover 18, are disposed inside the groove portions 50.

Seatback

Explanation follows regarding the seatback 16. The seatback 16 is formed by foam molding a foamable urethane resin, and includes a pair of side support portions 56 that suppresses the upper body of the seated occupant from sliding in the seat width direction. The side support portions 56 are formed extending up and down at both end portions of the seatback 16 in the seat width direction and protruding further forward than other locations.

The seatback 16 further includes a main portion 58 disposed between the pair of side support portions 56, a main upper portion 60 disposed above the main portion 58, and a main lower portion 62 disposed below the main portion 58. The main portion 58 supports the lumbar region of the seated occupant, and the main upper portion 60 supports the back of the seated occupant.

Groove portions 64 are formed extending up and down between the main upper portion 60, the main portion 58, and the main lower portion 62, and the pair of side support portions 56. Wires, not illustrated in the drawings, employed to fix the back cover 20, are disposed inside the groove portions 64.

Groove portions 66 are formed extending along the seat width direction between the main upper portion 60 and the main portion 58, and between the main portion 58 and the main lower portion 62. Wires, not illustrated in the drawings, employed to fix the back cover 20, are disposed inside the groove portions 66.

Cushion Cover

Explanation follows regarding the cushion cover 18. The cushion cover 18 includes a pair of side cover members 70 that covers the side support portions 40, a front portion cover member 72 that covers the main front portion 44, a main cover member 74 serving as an example of a cover member covering the main portion 42, and a rear portion cover member 76 that covers the main rear portion 46.

Figure 2:
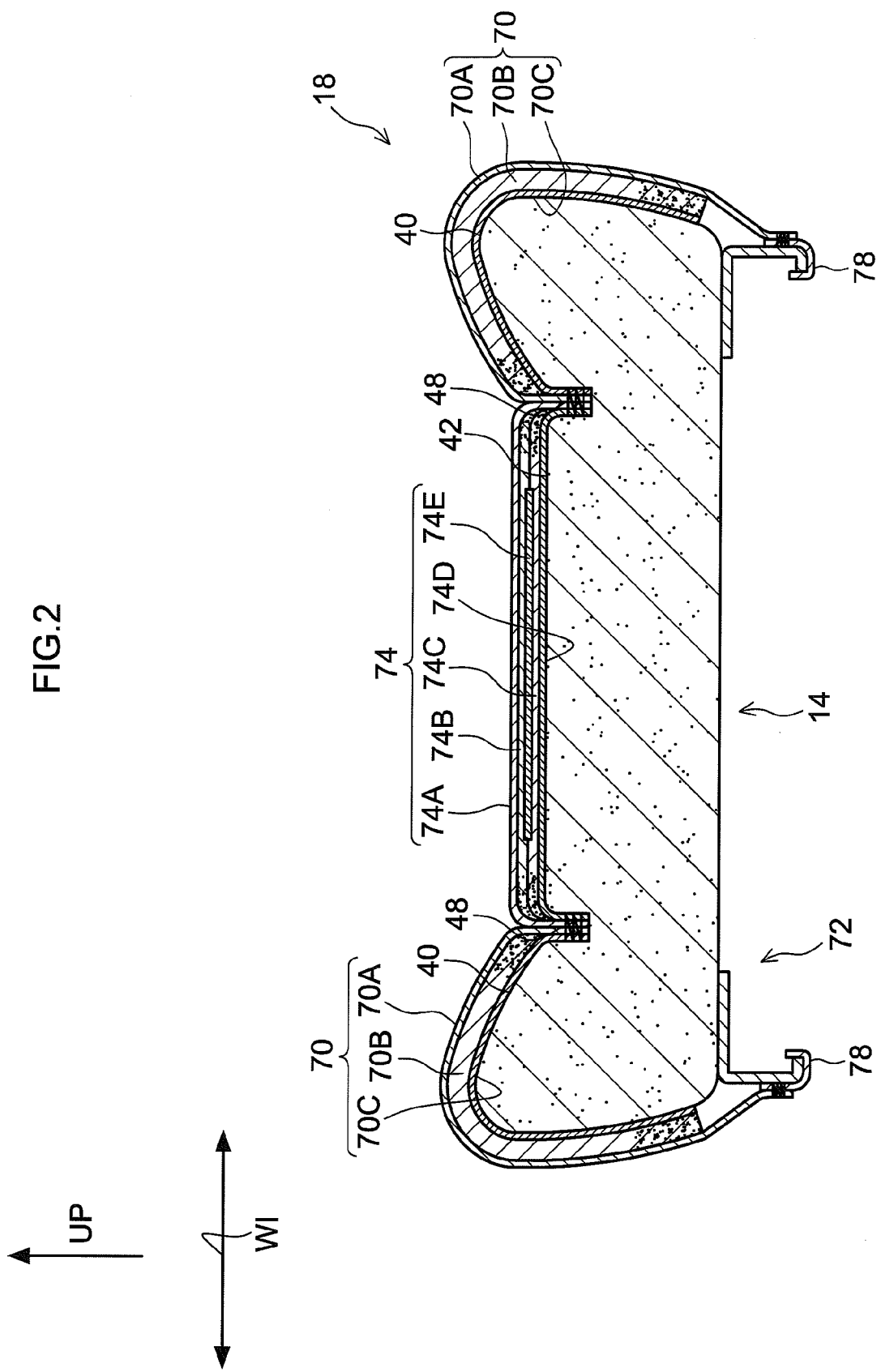
FIG. 2 is a cross-section of a seat cushion and the like employed in a seat according to the first exemplary embodiment, taken along the seat front-rear direction.

As illustrated in FIG. 1 and FIG. 2, surfaces of each of the covers are joined together by being aligned and sewn, etc. at mutual end sides.

As illustrated in FIG. 2, each side cover member 70 is formed in a layered structure layered with natural leather 70A disposed at the outer surface, a foam member 70B (such as a urethane slab) that is plate shaped foam body adhered to a back face (the inside) of the natural leather 70A, and a non-woven fabric 70C adhered to a back face of the foam member 70B.

As illustrated in FIG. 1, the front portion cover member 72 is formed in a layered structure layered with natural leather 72A disposed at the outer surface, a foam member 72B (such as de-skinned urethane) that is a plate shaped foam body adhered to a back face of the natural leather 72A, and a non-woven fabric 72C adhered to a back face of the foam member 72B.

As illustrated in FIG. 1, the rear portion cover member 76 is formed in a layered structure layered with natural leather 76A disposed at the outer surface, a foam member 76B (such as a urethane slab) that is a plate shaped foam body adhered to a back face side of the natural leather 76A, and a non-woven fabric 76C adhered to a back face of the foam member 76B.

Plural ring members, not illustrated in the drawings, are provided to the cushion cover 18 and employed to fix the cushion cover 18 to the wires, not illustrated in the drawings, disposed inside the groove portions 48 and the groove portions 50 of the seat cushion 14. Plural clips 78 (see FIG. 1, FIG. 2) for fixing the cushion cover 18 to the frame 12 are provided to end portions of the cushion cover 18.

Note that the structure of the main cover member 74 is explained in detail later.

Back Cover

Explanation follows regarding the back cover 20. As illustrated in FIG. 7, the back cover 20 includes a pair of side cover members 80 that covers the side support portions 56, an upper portion cover member 82 that covers the main upper portion 60, a main cover member 84 serving as an example of a cover member covering the main portion 58, and a lower portion cover member 86 that covers the main lower portion 62.

Surfaces of each of the covers are joined together by being aligned and sewn, etc. at mutual end sides.

Each side cover member 80 is formed in a layered structure layered with natural leather disposed at the outer surface, a foam member (such as a urethane slab) that is a plate shaped foam body adhered to a back face of the natural leather, and a non-woven fabric adhered to a back face of the foam member (with a similar configuration to the side cover members 70).

Figure 3:
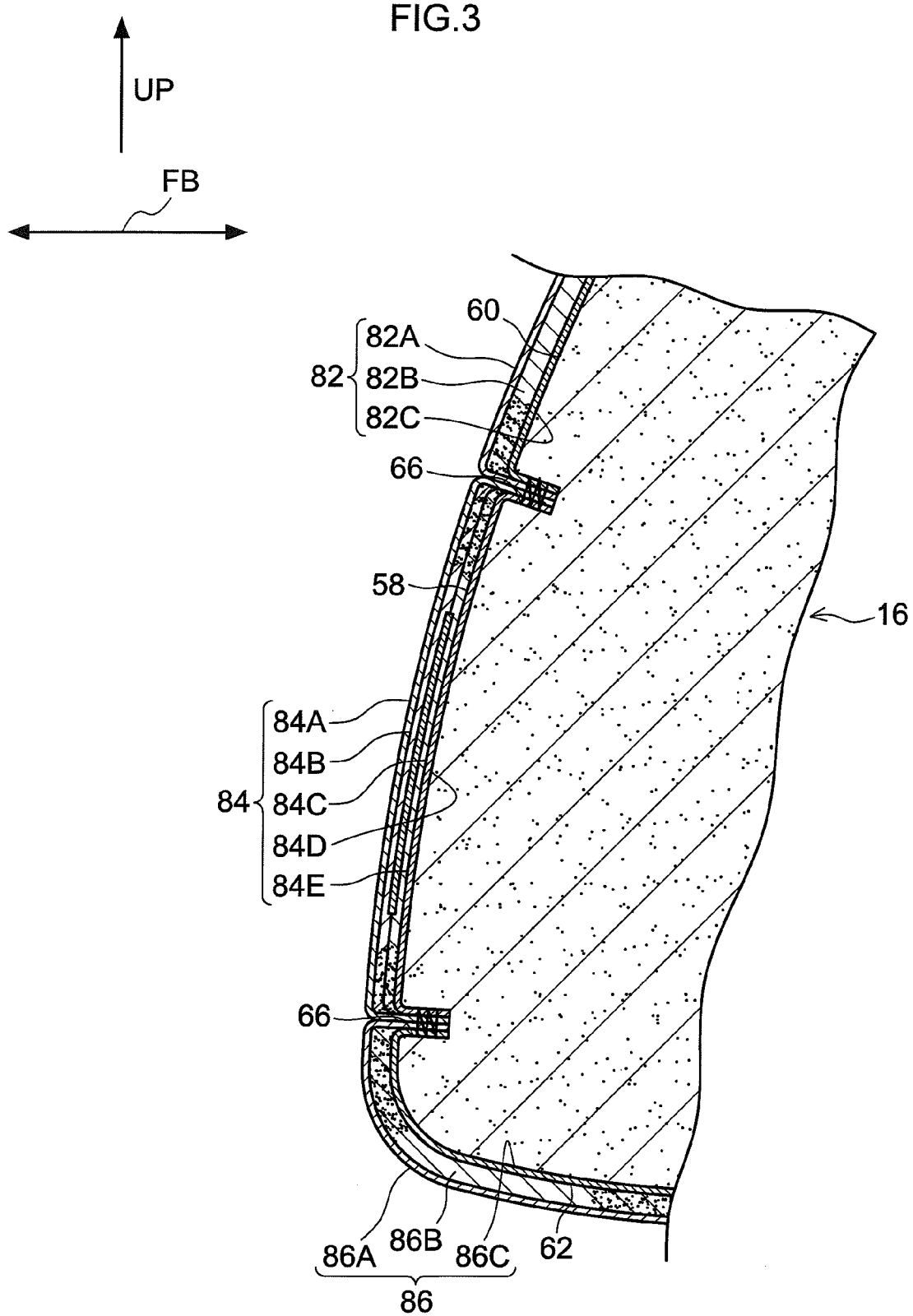
FIG. 3 is a cross-section of a seatback and the like employed in a seat according to the first exemplary embodiment, taken along the seat width direction.

As illustrated in FIG. 3, the upper portion cover member 82 is formed in a layered structure layered with natural leather 82A disposed at the outer surface, a foam member 82B (such as de-skinned urethane) that is a plate shaped foam body adhered to a back face of the natural leather 82A, and a non-woven fabric 82C adhered to a back face of the foam member 82B (with a similar configuration to the front portion cover member 72).

The lower portion cover member 86 is formed in a layered structure layered with natural leather 86A disposed at the outer surface, a foam member 86B (such as a urethane slab) that is a plate shaped foam body disposed at a back face side of the natural leather 86A, and a non-woven fabric 86C adhered to a back face of the foam member 86B (with a similar configuration to the rear portion cover member 76).

Plural ring members, not illustrated in the drawings, are provided to the back cover 20 and employed to fix the back cover 20 to the wires, not illustrated in the drawings, disposed inside the groove portions 64 and the groove portions 66 of the seatback 16. Plural clips, not illustrated in the drawings, for fixing the back cover 20 to the frame 12 are provided to end portions of the back cover 20.

Note that the structure of the main cover member 84 is explained in detail below.

Configuration of Relevant Portions

Explanation follows regarding the main cover member 74 and the main cover member 84.

As illustrated in FIG. 1 and FIG. 2, the main cover member 74 is formed in a layered structure layered with natural leather 74A disposed at the outer surface, a foam member 74B (such as de-skinned urethane) serving as an example of a first foam body, that is a plate shaped foam body adhered to a back face (the inside) of the natural leather 74A, a foam member 74C (such as de-skinned urethane) serving as an example of a second foam body, that is a plate shaped foam body adhered to a back face of the foam member 74B, and a non-woven fabric 74D adhered to a back face of the foam member 74C.

Figure 4:
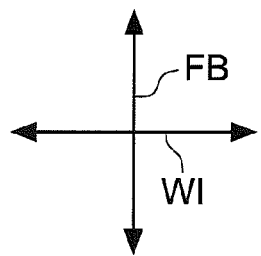
FIG. 4 is a plan view of a seat cushion and the like employed in a seat according to the first exemplary embodiment
Figure 4:
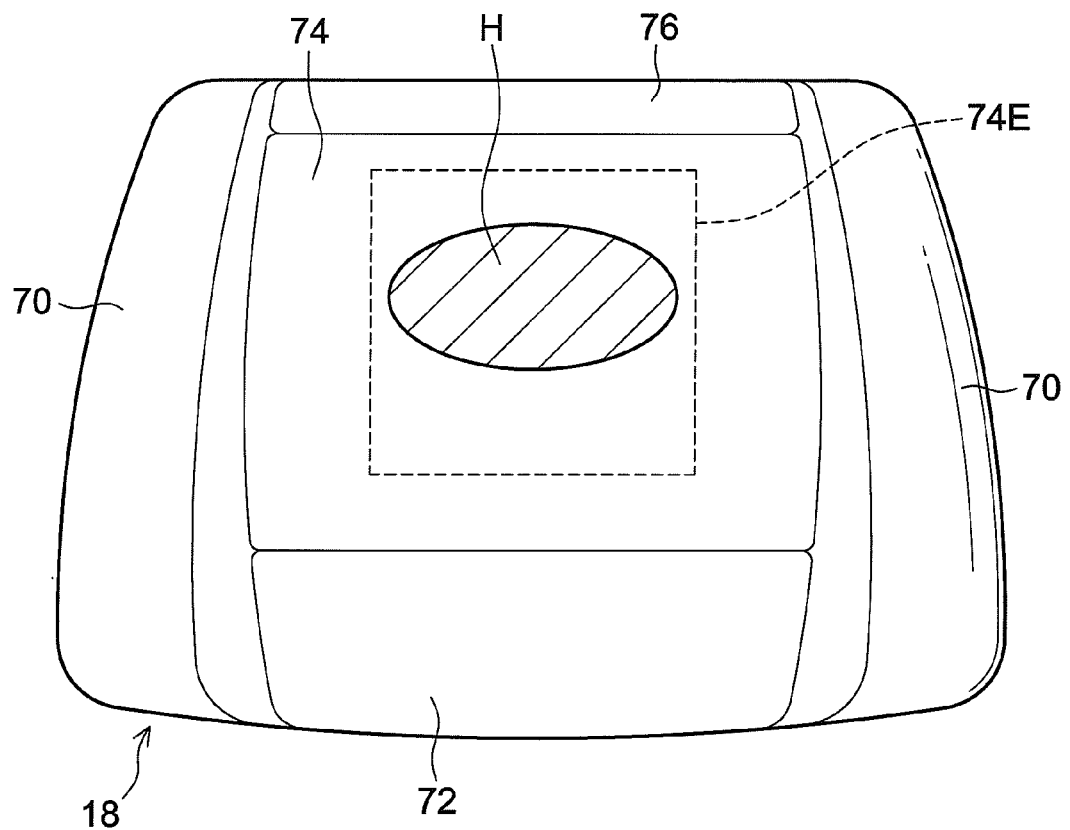

A non-woven fabric 74E is also disposed between the foam member 74B and the foam member 74C, so as to cover a location of contact with the buttocks of the seated occupant (an example of a body) as viewed from above (the diagonally hatched range H in FIG. 4). The non-woven fabric 74E is adhered to the foam member 74B and the foam member 74C.

In the present exemplary embodiment, the thickness of the foam member 74B is the same as the thickness of the foam member 74C. Moreover, the sum of the thickness of the foam member 74B and the thickness of the foam member 74C is the same as the thickness of the foam member 72B of the front portion cover member 72.

As illustrated in FIG. 3, the main cover member 84 is formed in a layered structure layered with natural leather 84A disposed at the outer surface, a foam member 84B (such as de-skinned urethane) serving as an example of a first foam body, that is a plate shaped foam body adhered to a back face (the inside) of the natural leather 84A, a foam member 84C (such as de-skinned urethane) serving as an example of a second foam body, that is a plate shaped foam body adhered to a back face of the foam member 84B, and a non-woven fabric 84D adhered to a back face of the foam member 84C.

Figure 5:
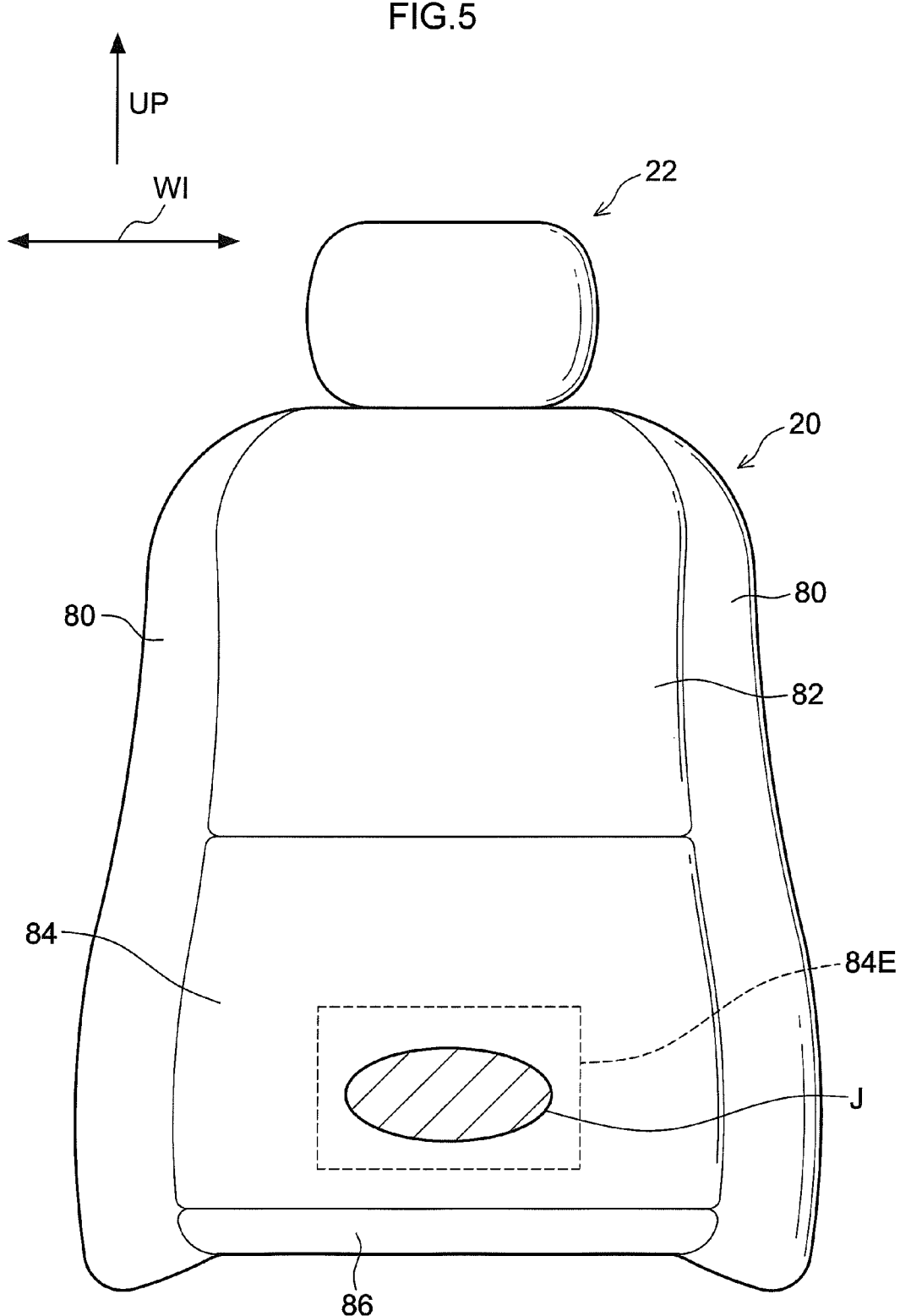
FIG. 5 is face-on view of a seatback and the like employed in a seat according to the first exemplary embodiment.
Figure 6:
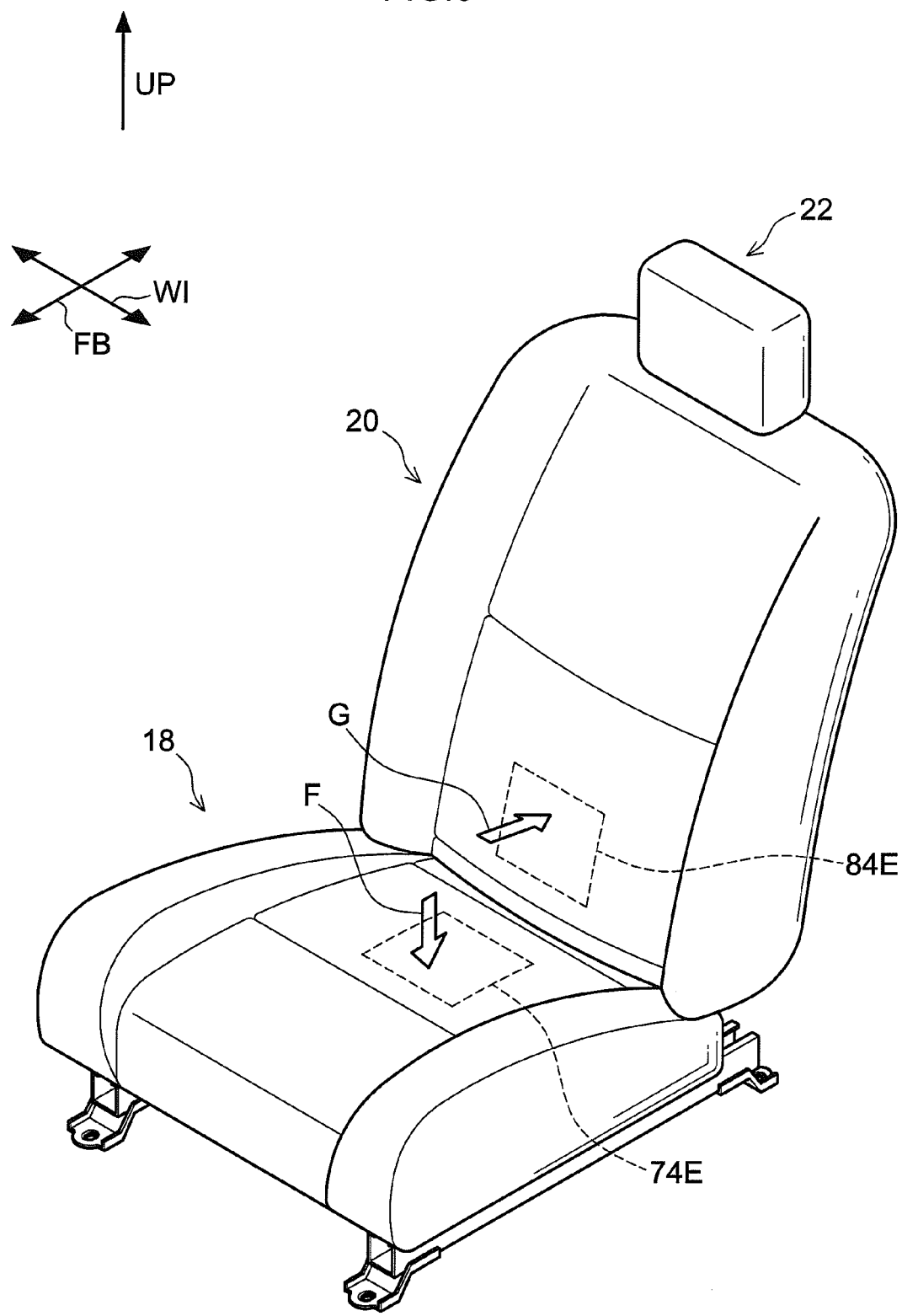
FIG. 6 is a perspective view of a seat according to the first exemplary embodiment.

A non-woven fabric 84E is also disposed between the foam member 84B and the foam member 84C, so as to cover a location of contact with the lumbar region of the seated occupant (an example of a body) as viewed from in front (the diagonally hatched range J in FIG. 5). The non-woven fabric 84E is adhered to the foam member 84B and the foam member 84C.

In the present exemplary embodiment, the thickness of the foam member 84B is the same as the thickness of the foam member 84C. Moreover, the sum of the thickness of the foam member 84B and the thickness of the foam member 84C is the same as the thickness of the foam member 82B of the upper portion cover member 82.

Operation and Advantageous Effects of Configuration of Relevant Portions

Explanation follows regarding operation and advantageous effects of the configuration of relevant portions.

First, explanation follows regarding the operation of the main cover member 74. When an occupant sits on the seat 10, the buttocks of the occupant contact the diagonally hatched range H of the main cover member 74 (see FIG. 4), and the main cover member 74 and the main portion 42 of the seat cushion 14 are pressed downward. Pressing force from the buttocks of the occupant is repeatedly applied to the main cover member 74 by the occupant boarding and alighting the vehicle (see the arrow F in FIG. 6).

Repeated pressing of the main cover member 74 results in localized repeated extension and contraction the natural leather 74A at the pressed diagonally hatched range H (see FIG. 4). It is conceivable that wrinkles may thereby occur on the natural leather 74A at the pressed portion.

However, the non-woven fabric 74E is disposed between the foam member 74B and the foam member 74C so as to cover the diagonally hatched range H of contact with the buttocks of the seated occupant when viewed from above (see FIG. 4). The non-woven fabric 74E suppresses the natural leather 74A from extending and contracting at the pressed portion, thereby suppressing wrinkles from occurring on the natural leather 74A at the pressed portion.

Namely, the extension-contraction amount of the natural leather 74A at the pressed portion is less than the extension-contraction amount of natural leather at a portion pressed by buttocks would be in a hypothetical case in which the non-woven fabric 74E is not disposed. Occurrence of wrinkles in the natural leather 74A at the pressed portion is thereby suppressed.

Furthermore, since placement of the non-woven fabric 74E is localized, the natural leather 74A at a portion where the non-woven fabric 74E is not disposed is repeatedly extended and contracted due to the occupant boarding and alighting the vehicle. A reduction in the seating comfort of the seat 10 is thereby suppressed.

Since the portion where the non-woven fabric 74E is not disposed is not a portion that is directly pressed by the buttocks of the occupant, the extension-contraction amount at this portion is less than the extension-contraction amount of natural leather at a portion pressed by buttocks would be in a hypothetical case in which the non-woven fabric 74E is not disposed. An outer peripheral side of the natural leather 74A at the portion, where the non-woven fabric 74E is not disposed, is in the vicinity of seams, and is a fixing location to the seat cushion 14. The outer peripheral side of the natural leather 74A is therefore less liable to become slack (easier to keep taut).

Wrinkles accordingly do not occur on the natural leather 74A at the portion where the non-woven fabric 74E is not disposed.

By thus only suppressing the extension-contraction amount of the natural leather 74A at the portion where wrinkles are liable to occur, the occurrence of wrinkles in the natural leather 74A can be suppressed while suppressing a reduction in the seating comfort of the seat 10.

In other words, stretching of the natural leather 74A is controlled by controlling the size of the non-woven fabric 74E. Thus the occurrence of wrinkles in the natural leather 74A can be suppressed while suppressing a reduction in the seating comfort of the seat 10.

If attempting to suppress wrinkles in natural leather in a configuration in which the non-woven fabric 74E is not employed, the grade of the leather would need to be controlled (portion designation). The cushion cover would accordingly be an expensive member. However, since wrinkles are suppressed by employing the non-woven fabric 74E, portion designation can be eliminated, and the cushion cover 18 can be formed as a lower cost member than if the portion was designated.

Explanation follows regarding operation of the main cover member 84. When an occupant sits on the seat 10, the lumbar region of the occupant contacts the diagonally hatched range J of the main cover member 84 (see FIG. 5), and the main cover member 84 and the main portion 58 of the seatback 16 are pressed toward the rear. Pressing force from the lumbar region of the occupant is repeatedly applied to the main cover member 84 by the occupant boarding and alighting the vehicle (see the arrow G in FIG. 6).

Repeated pressing of the main cover member 84 results in localized repeated extension and contraction of the natural leather 84A at the pressed diagonally hatched range J (see FIG. 5). It is conceivable that wrinkles may thereby occur on the natural leather 84A at the pressed portion.

However, the non-woven fabric 84E is disposed between the foam member 84B and the foam member 84C so as to cover the diagonally hatched range J of contact with the lumbar region of the seated occupant when viewed from in front (see FIG. 5). The non-woven fabric 84E suppresses the natural leather 84A from extending and contracting at the pressed portion, thereby suppressing wrinkles from occurring on the natural leather 84A at the pressed portion.

Namely, the extension-contraction amount of the natural leather 84A at the pressed portion is less than the extension-contraction amount of natural leather at a portion pressed by the lumbar region would be in a hypothetical case in which the non-woven fabric 84E is not disposed. Occurrence of wrinkles in the natural leather 84A at the pressed portion is thereby suppressed.

Furthermore, since placement of the non-woven fabric 84E is localized, the natural leather 84A at a portion where the non-woven fabric 84E is not disposed is repeatedly extended and contracted due to the occupant boarding and alighting the vehicle. A reduction in the seating comfort of the seat 10 is thereby suppressed.

Since the portion where the non-woven fabric 84E is not disposed is not a portion that is directly pressed by the lumbar region of the occupant, the extension-contraction amount at this portion is less than the extension-contraction amount of natural leather at a portion pressed by the lumbar region would be in a hypothetical case in which the non-woven fabric 84E is not disposed. An outer peripheral side of the natural leather 84A at the portion where the non-woven fabric 84E is not disposed is in the vicinity of seams, and is a fixing location to the seatback 16. The outer peripheral side of the natural leather 84A is therefore less liable to become slack (easier to keep taut).

Wrinkles accordingly do not occur on the natural leather 84A at the portion where the non-woven fabric 84E is not disposed.

By thus only suppressing the extension-contraction amount of the natural leather 84A at the portion where wrinkles are liable to occur, the occurrence of wrinkles in the natural leather 84A can be suppressed while suppressing a reduction in the seating comfort of the seat 10.

In other words, stretching of the natural leather 84A is controlled by controlling the size of the non-woven fabric 84E. Thus the occurrence of wrinkles in the natural leather 84A can be suppressed while suppressing a reduction in the seating comfort of the seat 10.

If attempting to suppress wrinkles in natural leather in a configuration in which the non-woven fabric 84E is not employed, the grade of the leather would need to be controlled (portion designation). The back cover would accordingly be an expensive member. However, since wrinkles are suppressed by employing the non-woven fabric 84E, portion designation can be eliminated, and the back cover 20 can be formed as a lower cost member than if the portion was designated.

Figure 8:
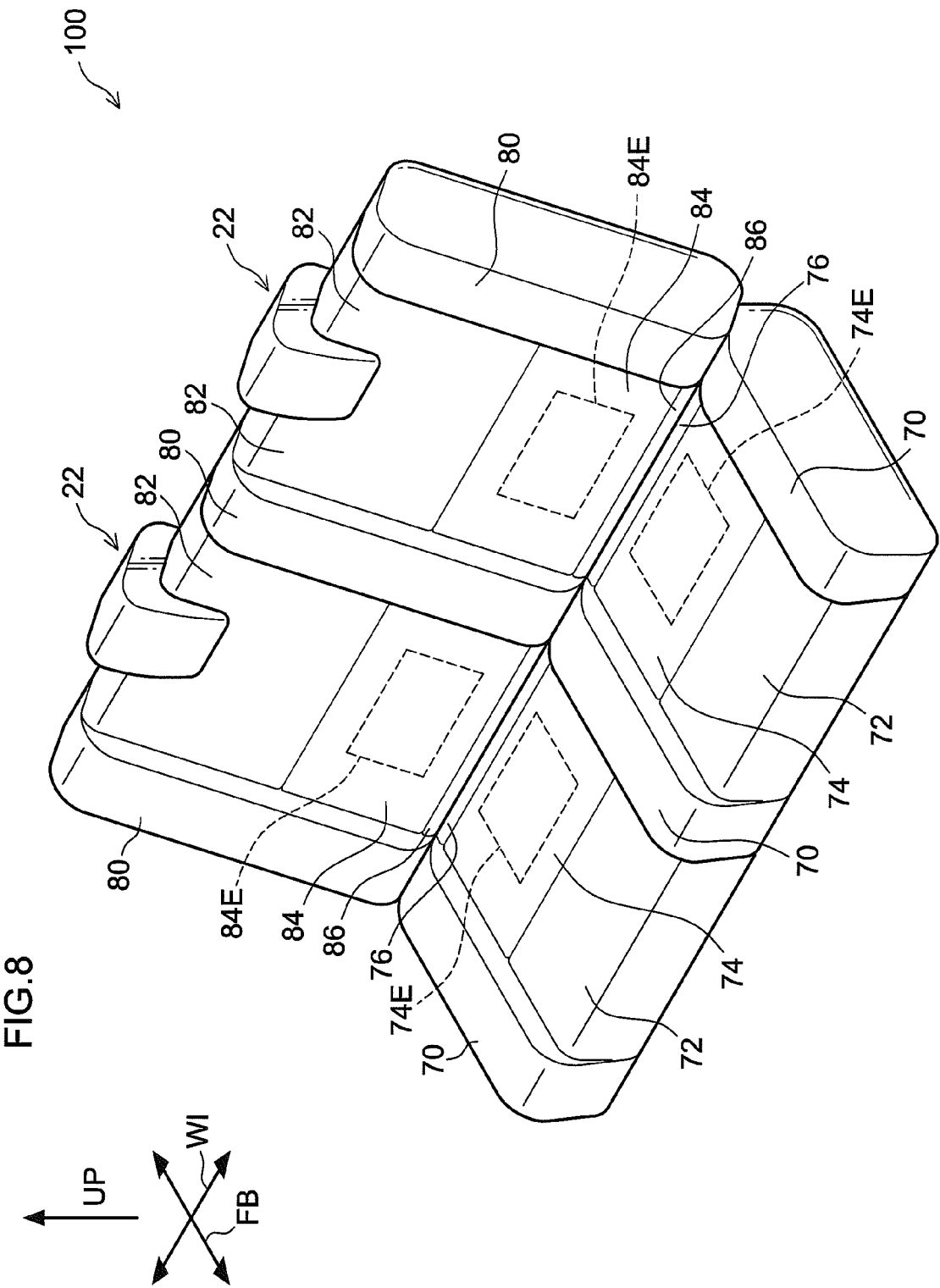
FIG. 8 is a perspective view of a seat according to a second exemplary embodiment.

Explanation follows regarding an example of a vehicle seat according to a second exemplary embodiment of the present invention, with reference to FIG. 8. Note that the same reference numerals are appended to similar members to the first exemplary embodiment, and explanation thereof is omitted.

As illustrated in FIG. 8, a seat 100 according to the second exemplary embodiment is a seat employed in a second row or a third row, etc. of a vehicle, rather than being a seat employed in the foremost row of the vehicle.

When an occupant repeatedly sits on one side (or the other side) of the seat 100 in the seat width direction, wrinkles are suppressed from occurring on a main cover member 74 and a main cover member 84.

Note that, although specific exemplary embodiments of the present invention have been explained in detail, the present invention is not limited thereto, and it would be obvious to a practitioner skilled in the art that various other embodiments may be implemented within the scope of the present invention. In the above exemplary embodiments, for example, non-woven fabric is provided to the lowermost layer of the side cover members 70, 80, the front portion cover member 72, the rear portion cover member 76, the upper portion cover member 82, and the lower portion cover member 86; however a configuration without this non-woven fabric may be applied.

Moreover, the non-woven fabric 74E and the non-woven fabric 84E are disposed so as to cover portions of contact with the buttocks and the lumbar region; however, rather than covering, the non-woven fabric 74E and the non-woven fabric 84E may be employed at portions of the main cover member 74 and the main cover member 84, thereby regulating (controlling) stretching of the main cover member 74 and the main cover member 84 in their entirety (the whole of the leather). By thus suppressing localized stretching of the natural leather 74A and the natural leather 84A, occurrence of wrinkles in natural leather employed in a cover may be suppressed while suppressing a reduction in the seating comfort of the seat.

What is claimed is:

1. A vehicle seat comprising:
   a seat cushion that supports the buttocks of a seated occupant;
   a seatback that supports the back and the lumbar region of the seated occupant; and
   a multi-layer cover member that configures a portion of a cover covering the seat cushion or the seatback, and comprises natural leather disposed at an outer surface of the multi-layer cover member, a plate shaped first foam body adhered to the inside of the natural leather, a plate shaped second foam body adhered to the inside of the first foam body, an inside non-woven fabric adhered to the inside of the second foam body, and an intermediate non-woven fabric adhered between the first foam body and the second foam body at a location of contact of the natural leather with the body of the seated occupant.

2. The vehicle seat of claim 1, wherein the intermediate non-woven fabric is provided at a location of contact between the buttocks of the occupant and the multi-layer cover member.

3. The vehicle seat of claim 2, wherein:
   the seat cushion comprises side support portions that protrude out further than other locations and suppress the seated occupant from sliding in the seat width direction, a main portion that is disposed between the side support portions and supports the buttocks of the seated occupant, and a main front portion that is disposed in front of the main portion and supports the thighs of the occupant; and
   the multi-layer cover member covers the main portion.

\* \* \* \* \*